(12) United States Patent
Hsu et al.

(10) Patent No.: US 7,074,727 B2
(45) Date of Patent: Jul. 11, 2006

(54) PROCESS FOR IMPROVING DIELECTRIC PROPERTIES IN LOW-K ORGANOSILICATE DIELECTRIC MATERIAL

(75) Inventors: Peng-Fu Hsu, Hsinchu (TW); Jyu-Horng Shieh, Hsinchu (TW); Yung-Cheng Lu, Taipei (TW); Hun-Jan Tao, Hsin-Chu (TW); Yuan-Hung Chiu, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 195 days.

(21) Appl. No.: 10/615,628

(22) Filed: Jul. 9, 2003

(65) Prior Publication Data

US 2005/0010000 A1    Jan. 13, 2005

(51) Int. Cl.
    *C08G 77/00*    (2006.01)
    *H01L 21/768*   (2006.01)

(52) U.S. Cl. .................. 438/788; 438/795; 525/274; 528/25; 528/480; 528/483; 528/488

(58) Field of Classification Search .......... 528/25, 528/480, 483, 488; 525/274; 438/788, 795; 257/E21.002
    See application file for complete search history.

(56) References Cited

U.S. PATENT DOCUMENTS 4,921,321 A * 5/1990 Weidman .............. 385/130
5,468,890 A * 11/1995 Herzig et al. ............ 556/12
6,346,490 B1   2/2002 Catabay et al.

OTHER PUBLICATIONS

Grant and Hackh's Chemical Dictionary, Donnely Sons Company, 1987, p. 304.*

Yang, S., et al., "Processing and Characterization of Ultralow-Dielectric Constant Organosilicate," J. Vac. Sci. Technol. B, vol. 19, No. 6 (Nov./Dec. 2001) pp. 2155-2161.

Terry, J., et al., "Alkyl-terminated Si(111) Surfaces: A High-Resolution, Core Level Photoelectron Spectroscopy Study," Journal of Applied Physics, vol. 85, No. 1 (Jan. 1, 1999) pp. 213-221.

Chang, T.C., et al., "Eliminating Dielectric Degradation of Low-k Organosilicate Glass by Trimethylchlorosilane Treatment," J.Vac. Sci. Technol. B., vol. 20, No. 4 (Jul./Aug. 2002) pp. 1561-1566.

Chang, T.C., et al., "Trimethylchlorosilane Treatment of Ultralow Dielectric Constant Material After Photoresist Removal Processing," Journal Of The Electrochemical Society, vol. 149, No. 10 (Aug. 2002) pp. F145-F148.

Mor, Y.S., et al., "Effective Repair to Ultra-Low-k Dielectric Material (k~2.0) by Hexamethldisilazane Treatment," J. Vac. Sci. Technol. B, vol. 20, No. 4 (Jul./Aug. 2002) pp. 1334-1338.

Chang, T.C., et al., "Recovering Dielectric Loss of Low Dielectric Constant Organic Siloxane During the Photoresist Removal Process," Journal Of The Electrochemical Society, vol. 149, No. 8 (Jun. 2002) pp. F81-F84.

Liu, P., et al., "Highly Reliable Chemical-Mechanical Polishing Process for Organic Low-k Methylsilsesquioxane," J. Vac. Sci. Technol. B, vol. 19, No. 4 (Jul./Aug. 2001) pp. 1212-1218.

Wolf, S., "Silicon Processing for the VLSI Era," vol. 4, Lattice Press, Sunset Beach, California (2002) pp. 639-670.

* cited by examiner

*Primary Examiner*—Jeffrey Mullis
(74) *Attorney, Agent, or Firm*—Slater & Matsil, L.L.P.

(57) ABSTRACT

Low-k organosilicate dielectric material can be exposed to a series of reagents, including a halogenation reagent, an alkylation reagent, and a termination reagent, in order to reverse degradation of dielectric properties caused by previous processing steps.

14 Claims, 2 Drawing Sheets

PROCESS FOR IMPROVING DIELECTRIC PROPERTIES IN LOW-K ORGANOSILICATE DIELECTRIC MATERIAL

TECHNICAL FIELD

The present invention relates generally to semiconductor fabrication processes and more particularly to a process for repairing degradation of dielectric properties of low-k organosilicate dielectric material.

BACKGROUND

As semiconductor devices are scaled down to smaller feature sizes, interconnect delay becomes a significant performance barrier for high-speed signal conduction. The use of dielectric materials with a lower dielectric constant (k) can significantly improve performance measures by reducing signal propagation time delay, cross talk, and power consumption in semiconductor devices having a multilevel interconnect architecture. The most-used dielectric material for semiconductor fabrication has been silicon oxide ($SiO_2$), which has a dielectric constant in the range of k=3.9 to 4.5, depending on its method of formation. Dielectric materials with k less than 3.9 are classified as 'low-k dielectrics'. Some low-k dielectrics are organosilicates formed by doping silicon oxide with carbon-containing compounds. One such low-k dielectric material is methylsilsesquioxane (MSQ), which is a polymer having an inorganic backbone of alternating silicon and oxygen atoms with methyl ($CH_3$) groups attached to the silicon by a silicon-carbon (Si—C) bond. MSQ typically has a dielectric constant in the range k=2.6–2.8.

Well-known steps in the fabrication of a semiconductor device include forming a layer of dielectric material on a silicon wafer or on previous levels of the device, applying a layer of photoresist material to the surface of dielectric material, exposing areas of the photoresist layer to light through a pattern mask, dissolving the exposed areas of photoresist with a developer solution to reveal the underlying areas of dielectric material, etching the revealed areas of dielectric material, removing the remaining photoresist layer, and filling the etched dielectric material with metal.

The steps of etching the dielectric material and removing the photoresist layer may be performed with an $O_2$-containing plasma, which can degrade the dielectric properties of the dielectric material through oxidation. This damage to the material is believed to occur when Si—C bonds are broken and hydrophilic hydroxyl (OH) groups replace the hydrophobic methyl groups in the MSQ. The polarity of the dielectric material is thus changed and the damaged dielectric more easily absorbs moisture, resulting in an increase of both leakage current and dielectric constant. Subsequent heating of the damaged dielectric material can release moisture, interfering with the process of filling the etched cavities with metal. Semiconductor devices fabricated with such damaged dielectric material exhibit reduced performance measures and increased fabrication defects compared to devices fabricated with undamaged dielectric material.

Degradation of the dielectric properties of MSQ through substitution of hydroxyl groups for methyl groups may occur in other processing steps as well, such as creating nanopores in the dielectric layer by forming it from a composite of MSQ and triblock copolymer, e.g., poly(ethylene oxide-b-propylene oxide-b-ethylene oxide), and calcinating the block polymer to generate pores. Another processing step, chemical-mechanical polishing, can also produce increased leakage current and dielectric constant in MSQ. The kinematic mechanical abrasion and a chemical reaction with polishing additives such as tetramethylammonium hydroxide can break the Si—C bonds, resulting in moisture uptake and dielectric degradation.

Experiments have shown that treating the damaged dielectric material with trimethylchlorosilane (TMCS) (($CH_3$)$_3$Si—Cl) reduces the leakage current and dielectric constant of the material. This is thought to result from a reaction in which the TMCS replaces a hydrophilic hydroxyl group with hydrophobic trimethylsiloxane (($CH_3$)$_3$SiO), causing a decrease in the moisture uptake of the treated dielectric. Treatment with hexamethyldisilazane (HMDS) (($CH_3$)$_3$Si—NH—Si($CH_3$)$_3$) has also been shown to reduce leakage current and dielectric constant. This is thought to result from a reaction in which two hydroxyl groups are replaced with trimethylsiloxane. These are relatively inefficient chemical replacement reactions, however, which require high pressures or long treatment times to achieve their results. Furthermore, while replacing the hydrophilic hydroxyl groups with hydrophobic methyl groups, these treatments have not been shown to restore the silicon-carbon bonds and, as a result, the polarity of the damaged dielectric material.

Alternatively, the damaged dielectric material can be treated with hydrocarbon, fluorocarbon, or organo-substituted silane gases (e.g., ($CH_3$)$_x$SiH$_{(4-x)}$, where x is 1 to 4). This treatment has been shown to reduce defects in metal fillings deposited on the treated dielectric material. However, the effect of this treatment on the dielectric properties of the damaged dielectric material has not been demonstrated.

SUMMARY OF THE INVENTION

In view of the foregoing disadvantages inherent in restoring degraded dielectric properties of low-k dielectric material, aspects of the present invention can be found in a process of treating the material with a series of reagents. Processes employing the present invention are more efficient and may require lower pressures and shorter treatment times than prior treatment processes.

More specifically, aspects of the invention can be found in a process for treating low-k organosilicate dielectric material including the steps of exposing the material to a halogenation reagent, an alkylation reagent, and a termination reagent. Further aspects of the invention can be found in performing steps of the method in the same chamber as a process that breaks at least one silicon-carbon bond in the dielectric material.

Other aspects of the invention can be found in the following process for fabricating an insulating layer on an integrated circuit structure. A layer of low-k organosilicate dielectric material is formed on the integrated circuit structure. A resist mask is formed on the dielectric material, the material is etched, and the resist mask is removed. The dielectric material is exposed to a halogenation reagent, an alkylation reagent, and a termination reagent.

Other aspects of the invention can be found in a semiconductor device with a methylsilsesquioxane dielectric that has had one or more of its methyl groups replaced by end group molecules. The chemical formula of the end group molecules is $R_1OR_2$, where $R_1$ is an alkyl with a carbon chain of five or fewer carbon atoms (a $C_1$–$C_5$ lower alkyl) and $R_2$ is either trimethylsilyl (Si($CH_3$)$_3$) or a $C_1$–$C_5$ lower alkyl.

Further aspects of the invention are found in a treatment for low-k organosilicate dielectrics whose dielectric properties have been degraded by a previous step in the semiconductor fabrication process. Steps of the treatment include exposing the damaged dielectric to a halogenation reagent, an alkylation reagent, and a termination reagent.

The foregoing has outlined rather broadly the features and technical advantages of the present invention in order that the detailed description of the invention that follows may be better understood. Additional features and advantages of the invention will be described hereinafter which form the subject of the claims of the invention.

It should be appreciated by those skilled in the art that the conception and specific embodiment disclosed may readily be utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which like reference numbers indicate like features and wherein.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an organosilicate low-k dielectric whose dielectric properties have been degraded through oxidation by exposure to $O_2$ plasma. The invention may also be applied, however, to such dielectrics that have had silicon-carbon bonds broken by other steps in the semiconductor fabrication process.

Figure 1:
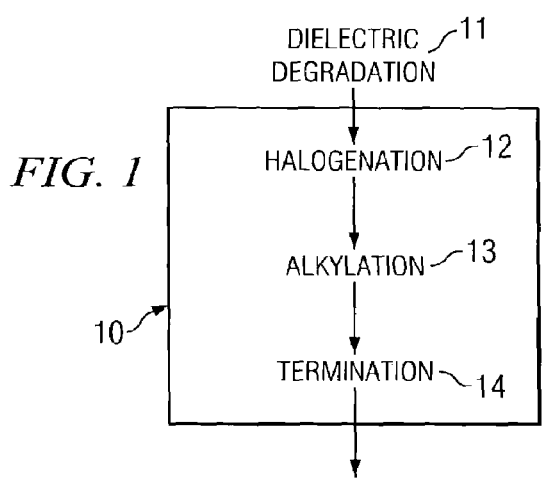
FIG. 1 is a flowchart illustrating a process embodying the invention.

With reference now to FIG. 1, there is shown a process 10 embodying the present invention. A previous step in the semiconductor fabrication process 11, degrades the dielectric properties of low-k dielectric material. This step might be $O_2$ plasma etching of the dielectric or it might be the removal of photoresist by 'ashing' with $O_2$ plasma or by 'wet stripping' with solutions containing components such as hydroxamine ($NH_2OH$) and ethanolamine ($HO-C_2H_2-NH_2$). This step might also be chemical-mechanical polishing to planarize the dielectric material or the removal of sacrificial materials to increase the porosity of the dielectric material. Regardless of the source of the dielectric degradation, the embodiment of the present invention shown in process 10 repairs the dielectric through the steps of halogenation 12, alkylation 13, and termination 14 of the degraded dielectric.

Figure 2:
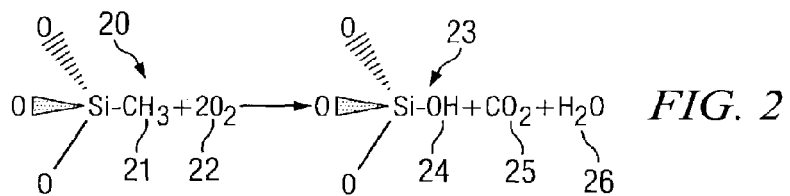
FIG. 2 is a reaction diagram showing a proposed oxidation reaction that damages the low-k dielectric.

A proposed reaction through which the organosilicate low-k dielectric material may be damaged by $O_2$ plasma is illustrated in FIG. 2. Methylsilsesquioxane (MSQ) 20 has methyl ($CH_3$) groups 21 attached to silicon by a silicon-carbon bond. When exposed to $O_2$ plasma 22, hydroxyl groups 24, attached by a silicon-oxygen bond, replace some of the methyl groups, creating damaged dielectric material 23 and the byproducts carbon dioxide 25 and water 26. The replacement of the silicon-carbon bonds in MSQ by silicon-oxygen bonds changes the polarity of the dielectric material, leading to a first degradation in the material's dielectric properties.

Figure 3:
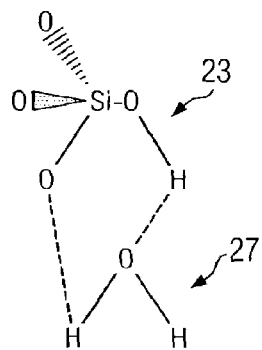
FIG. 3 is a is a reaction diagram showing the uptake of water by the damaged dielectric.

The displacement of hydrophobic methyl groups by hydrophilic hydroxyl groups also promotes moisture uptake, as shown in FIG. 3, causing a second degradation in the dielectric properties of the material. Water molecules 27 are thought to attach to the damaged dielectric material 23 by hydrogen bonding (dashed lines). The high polarity of the water molecules (k~78) causes an increase in both the dielectric constant and leakage current of the dielectric material.

Figure 4:
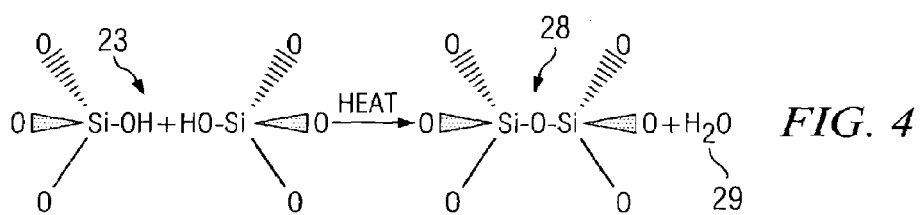
FIG. 4 is a reaction diagram illustrating the release of water when the damaged dielectric is heated.

Further problems with the damaged dielectric material arise during subsequent processing steps, such as annealing, in which the material is heated. FIG. 4 illustrates this situation. The hydroxyl groups that have replaced methyl groups can react with each other when heated to produce an Si—O—Si linkage 28 and release a water molecule 29. This release of water vapor is thought to cause defective metal filling of etched cavities in the dielectric material.

Figure 5:
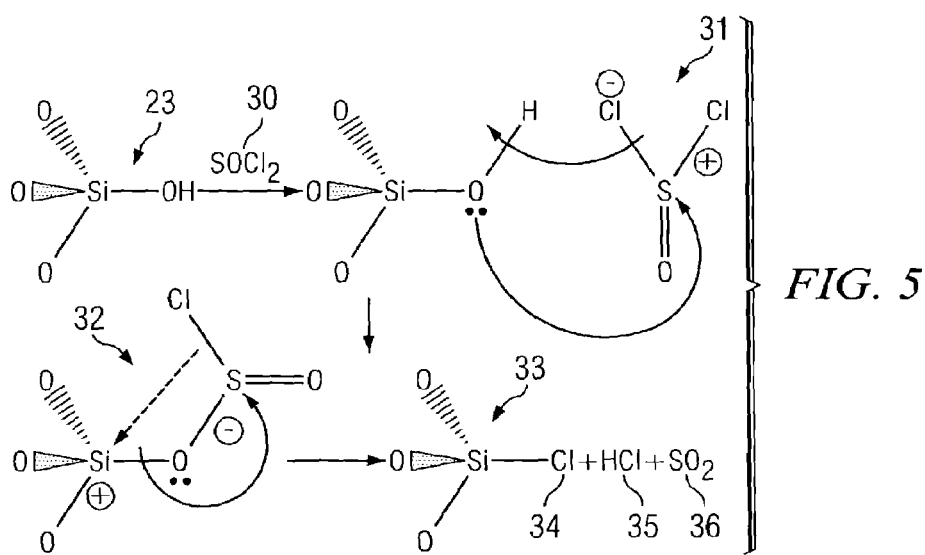
FIG. 5 is a reaction diagram of one embodiment of the halogenation step of the present invention.

The first step of a repair process embodying the present invention is the exposure of the degraded dielectric material to a halogenation reagent. One example of such a halogenation reaction is shown in FIG. 5. The damaged dielectric material 23 with its hydroxyl end group is exposed, in this embodiment, to thionyl chloride ($SOCl_2$) 30. Two intermediate reactions 31 and 32 produce a final compound in which chlorine 34 has replaced the hydroxyl group in the first product 33 of the repair process, and byproducts hydrogen chloride (HCl) 35 and sulfur dioxide ($SO_2$) 36 are produced. In the first step of the reaction, the thionyl chloride undergoes a substitution nucleophilic bimolecular ($S_N2$) reaction 31 with the hydroxyl group to produce an intermediate product and hydrogen chloride. In a second reaction step 32, the chlorine atom bonds to the silicon in the dielectric material, and sulfur dioxide is released as a byproduct.

Thionyl chloride is only one of the halogenation reagents that may be used in this embodiment of the present invention. Other reagents that cause the hydroxyl group to be replaced with chlorine include $PCl_3$, PClS, $POCl_3$, and $Cl_2$. Halogenation reagents that cause the hydroxyl group to be replaced with bromine include $SOBr_2$, $PBr_3$, $PBr_5$, and $Br_2$.

The reagents $SOCl_2$, $PCl_3$, $PCl_5$, $POCl_3$, $SOBr_2$, $PBr_3$ and $PBr_5$ are used in liquid form. An inert gas, such as $N_2$ or $Ar_2$, at a pressure that can range from about 10 militorr to about 10 Torr, but that is preferably about 0.2 Torr, is used to carry the vapor from the liquid reagent into the reaction chamber. Heating the reservoir of liquid reagent will increase the vapor pressure of the reagent. The reagents $Cl_2$ and $Br_2$ are used in gaseous form, at a pressure that can range from about 10 militorr to about 10 Torr, but that is preferably about 0.2 Torr. The flow rate of the halogenation reagent into the chamber can range from about 5 standard cubic centimeters per minute (sccm) to about 500 sccm, but is typically about 250 sccm. The halogenation step is performed at a temperature in the range between about 25° C. and about 300° C., but preferably at a temperature of about 150° C. In the flow rate, pressure and temperature ranges listed above, this step of the treatment typically takes about 5 minutes to replace all the hydroxyl groups in the damaged dielectric material with halogen atoms.

Figure 6:
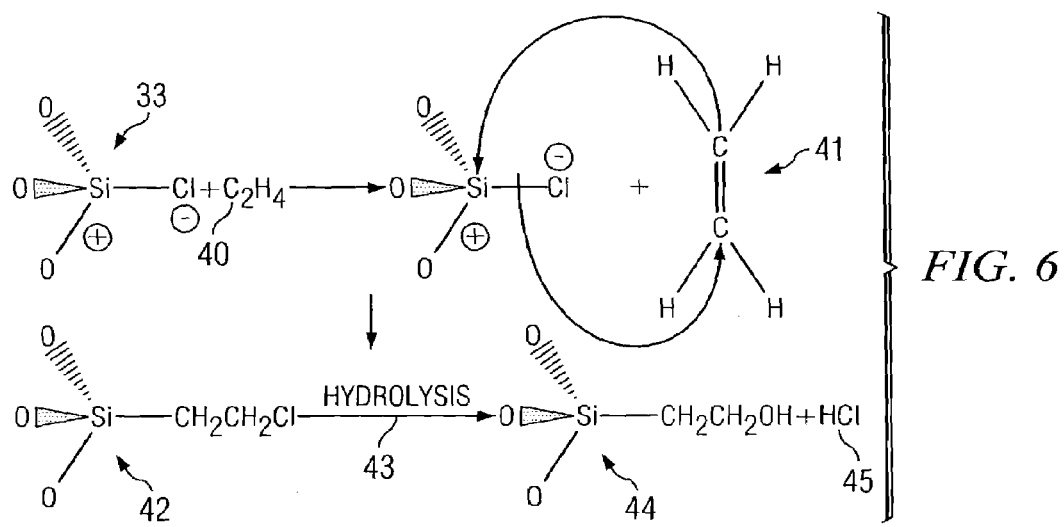
FIG. 6 is a reaction diagram of an embodiment of the alkylation step of the present invention.

The second step of a repair process embodying the present invention is the exposure of the halogenated dielectric material to an alkylation reagent. FIG. 6 presents one such alkylation step. The first product 33 of the repair process is exposed to ethylene ($C_2H_4$) 40. The two substances undergo a $S_N2$ reaction 41 to produce the intermediate product 42. Exposure to water vapor causes a hydrolysis reaction 43 that produces the second product 44 of the repair process, and HCl 45 as a byproduct. The HCl gas is preferably pumped away by a vacuum system. At this stage, the silicon-carbon bond has been re-established, but a hydrophilic hydroxyl end group is still present to cause moisture uptake in the dielectric material.

While ethylene is employed as the alkylation reagent in the embodiment of the invention illustrated in FIG. 6, other alkylation reagents can also be used, e.g., propylene ($C_3H_6$), 1-butylene ($H_2C=CH-C_2H_5$), or a Grignard reagent (RLi or RMgX, where R is an alkyl group and X is a halogen atom). Note, however, that Grignard reagents produce lithium or magnesium salts as vaporous reaction by-products. Preferable characteristics of the alkylation reagent are that it has a small molecular size, i.e., a carbon chain of five or fewer atoms ($C_1-C_5$ lower alkyl), and that it provides an electron long pair easily. The alkylation reagent is used in its gaseous form at a pressure of about 10 militorr to about 10 Torr, typically about 0.2 Torr. The flow rate of the alkylation reagent into the chamber can range from about 5 sccm to about 500 sccm, but is preferably about 250 sccm. The alkylation step is performed at a temperature in the range from about 25° C. to about 300° C., but typically at about 150° C. Typically, 5 minutes exposure to the alkylation reagent will suffice to replace all the halogen atoms in the first product of the repair process with alkyl hydroxyl end groups.

Figure 7:
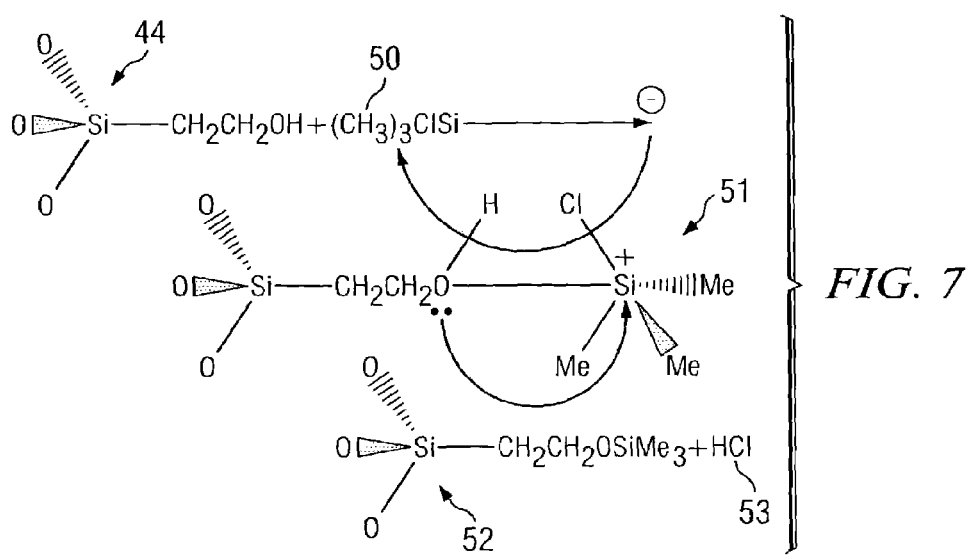
FIG. 7 is a reaction diagram of one embodiment of the termination step of the present invention.

The final step of a repair process embodying the present invention is the exposure of the second product of the repair process to a termination reagent, an embodiment of which is illustrated in FIG. 7. The second product of the repair process 44 is exposed to trimethylchlorosilane (TMCS) (($CH_3)_3ClSi$) 50, a $S_N2$ reaction 51 occurs, and the final product of the repair process 52 is produced, along with HCl 53 as a byproduct. The hydrophilic hydroxyl end group of the second product 44 is thus replaced with a hydrophobic trimethylsilyl end group, preventing moisture uptake by the dielectric material.

The termination reagent TMCS is shown in FIG. 7, but other reagents can be used is other embodiments of the invention, e.g., hexamethyldisilazane (($CH_3)_3Si-NH-Si(CH_3)_3$) and alkyl halides (RX, where R is an alkyl, alkenyl, or alkynyl group, and X is a halogen). The termination reagents are used in liquid form and an inert gas, such as $N_2$ or $Ar_2$, at a pressure of about 10 militorr to about 10 Torr, preferably at a pressure of about 0.2 Torr is used to carry the vapor of the liquid reagent into the reaction chamber. The vapor pressure of the reagent can be increased by heating the reservoir containing the reagent. The flow rate of the termination reagent into the chamber can range from about 5 sccm to about 500 sccm, but is typically about 250 sccm. The termination step is performed at a temperature between about 50° C. and about 300° C., preferably about 150° C. Typically, about five minutes exposure to the termination reagent is required to replace all the hydroxyl end groups in the second product of the repair process with trimethylsilyl end groups. If alkyl halides are used as the termination reagent, the hydroxyl end groups are replaced with alkyl end groups.

The steps of a process embodying the present invention are preferably carried out in situ with the preceding step in the fabrication process that damages the dielectric material. This is because the damaged dielectric material, the halogenation reagents and the intermediate products of the halogenation reaction are moisture sensitive. By performing the processing in a cluster tool with multiple chambers, the environment can be controlled during and between processing steps in order to control exposure to moisture. A vacuum system can be used to carry away the gaseous byproducts of the reaction. Alternatively, however, the semiconductor wafer being treated can be transported from one processing site to another in a sealed chamber to prevent moisture uptake.

Processes embodying the present invention employ more efficient chemical replacement reactions than previous treatments for degraded organosilicate low-k dielectrics. However, one skilled in the chemical arts will be aware that supplying heat or energy to an endothermic reaction system can speed up the rate of the reaction. Energy generators such as hot plates, microwave generators, and light emission sources can be used to supply heat or energy to a chemical reaction. Thus, to further shorten the time required to perform a process according to the present invention, an energy generator can be placed in the reaction chamber where the process is performed.

In summary, a process according to the present invention operates using more efficient chemical replacement reactions to restore the dielectric properties of organosilicate low-k dielectric material that have been degraded by previous semiconductor fabrication processing steps. Such a treatment replaces the hydroxyl groups in the degraded dielectric material with end groups of the form $R_1OR_2$, wherein $R_1$ is a $C_1-C_5$ lower alkyl and $R_2$ is either trimethylsilyl ($Si(CH_3)_3$) or a $C_{11}-C_5$ lower alkyl. As a result of the treatment, it appears that Si—OH bonds in the damaged dielectric material are replaced with Si—C bonds, and the hydrophobic property of the material is restored to prevent moisture uptake.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A process for treating organosilicate dielectric material, comprising:
   exposing the organosilicate dielectric material to a halogenation reagent;
   exposing the organosilicate dielectric material to an alkylation reagent; and
   exposing the organosilicate dielectric material to a termination reagent.

2. The process of claim 1 wherein the halogenation reagent is selected from the group consisting $SOCl_2$, $SOBr_2$, $PCl_5$, $PBr_5$, $POCl_3$, $Cl_2$, and $Br_2$.

3. The process of claim 1 wherein the alkylation reagent is selected from the group consisting of ethylene, propylene, 1-butylene, and Grignard reagents.

4. The process of claim 1 wherein the process occurs in the same environment as a prior process that breaks at least one silicon-carbon bond in the dielectric material.

5. The process of claim 1 further comprising using an energy generator to increase the reaction rate of the process.

6. A process for fabricating an insulating layer on an integrated circuit structure comprising:
   forming a layer of organosilicate insulating dielectric material on the integrated circuit structure;
   forming a resist mask on the layer of dielectric material;
   etching the layer of dielectric material using the mask;
   removing the resist mask;
   exposing the dielectric material to a halogenation reagent;
   exposing the dielectric material to an alkylation reagent; and
   exposing the dielectric material to a termination reagent.

7. The process of claim 6 wherein the halogenation reagent is selected from the group consisting of $SOCl_2$, $SOBr_2$, $PCl_3$, $PBr_3$, $PCl_5$, $PBr_5$, $POCl_3$, $Cl_2$, and $Br_2$.

8. The process of claim 6 wherein the alkylation reagent is selected from the group consisting of ethylene, propylene, 1-butylene, and Grignard reagents.

9. A process for fabricating an insulating layer on an integrated circuit structure comprising:
   forming a layer of organosilicate insulating dielectric material on the integrated circuit structure;
   forming a resist mask on the layer of dielectric material;
   etching the layer of dielectric material using the mask;
   removing the resist mask;
   exposing the dielectric material to a halogenation reagent;
   exposing the dielectric material to an alkylation reagent;
   exposing the dielectric material to a termination reagent, wherein the termination reagent is selected from the group consisting of trimethylchlorosilane, hexamethyldisilazane, and alkyl halides.

10. The process of claim 6 wherein the removal of the photoresist mask and the exposure to the reagents are performed in a common chamber.

11. The process of claim 10 further comprising using an energy generator in the chamber to increase the reaction rate of the process.

12. A process for further treating damaged low-k organosilicate dielectric material whose dielectric properties have been degraded by a previous processing step, comprising:
   exposing the degraded organosilicate dielectric material to a halogenation reagent;
   exposing the organosilicate dielectric material to an alkylation reagent; and
   exposing the organosilicate dielectric material to a termination reagent.

13. The process of claim 12 wherein the termination reagent is selected from the group consisting of trimethylchlorosilane, hexamethyldisilazane, and alkyl halides.

14. A process for treating organosilicate dielectric material, comprising:
   exposing the material to a halogenation reagent;
   exposing the material to an alkylation reagent; and
   exposing the material to a termination reagent, wherein the termination reagent is selected from the group consisting of trimethylchlorosilane, hexamethyldisilazane, and alkyl halides.

* * * * *